United States Patent
Walkowiak et al.

(10) Patent No.: US 12,022,408 B2
(45) Date of Patent: *Jun. 25, 2024

(54) METHOD OF COMPENSATING WITH FEEDBACK

(71) Applicant: Molex CVS Hildesheim GmbH, Hildesheim (DE)

(72) Inventors: Tymoteusz Walkowiak, Nuremberg (DE); Werner Pohlabeln, Igensdorf (DE)

(73) Assignee: Molex CVS Hildesheim GmbH, Hildesheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/948,257

(22) Filed: Sep. 20, 2022

(65) Prior Publication Data

US 2023/0010777 A1    Jan. 12, 2023

Related U.S. Application Data

(63) Continuation of application No. 16/925,354, filed on Jul. 10, 2020, now Pat. No. 11,483,778.

(60) Provisional application No. 62/939,289, filed on Nov. 22, 2019, provisional application No. 62/874,731, filed on Jul. 16, 2019.

(51) Int. Cl.
*H04W 52/52* (2009.01)
*H01Q 1/32* (2006.01)
*H04B 1/3822* (2015.01)

(52) U.S. Cl.
CPC .......... *H04W 52/52* (2013.01); *H04B 1/3822* (2013.01); *H01Q 1/32* (2013.01)

(58) Field of Classification Search
CPC ....... H04B 1/38; H04B 1/3822; H04W 52/52; H04W 52/38; H01Q 1/32
See application file for complete search history.

(56) References Cited

U.S. PATENT DOCUMENTS 4,636,741 A * 1/1987 Mitzlaff ................ H03F 1/0233
  455/99
6,230,031 B1    5/2001 Barber
9,191,903 B2   11/2015 Sasson
(Continued)

FOREIGN PATENT DOCUMENTS

CN    101227212 A    7/2008
CN    105934889 A    9/2016
(Continued)

OTHER PUBLICATIONS

Notice of Allowance for CN Application No. 202010679899.X, mailed on Oct. 13, 2022, 07 Pages (03 Pages of English Translation and 04 Pages of Official notificiation).
(Continued)

*Primary Examiner* — Blane J Jackson

(57) ABSTRACT

A system can be used to provide a method of compensation. The method includes providing a Tx level signal indicative of a desired signal level along with a Tx signal. A gain modifier adjusts the gain used on the Tx signal based on the Tx level signal. The adjusting can be done with a controller that uses feedback from the actual power level of the Tx signal provided by the gain modifier to ensure a desired power level of the Tx signal being transmitted from an antenna is maintained.

18 Claims, 5 Drawing Sheets

(56) References Cited

U.S. PATENT DOCUMENTS

| | | |
|---|---|---|
| 9,491,713 B2 | 11/2016 | Dykyy et al. |
| 10,021,652 B2 | 7/2018 | Gossner et al. |
| 10,136,398 B2 | 11/2018 | Morhart et al. |
| 2014/0148214 A1 | 5/2014 | Sasson |
| 2021/0022092 A1 | 1/2021 | Walkowiak et al. |

FOREIGN PATENT DOCUMENTS

| | | | |
|---|---|---|---|
| DE | 102014215578 A1 | 2/2016 | |
| EP | 0413355 A2 * | 8/1990 | ............... H04B 1/40 |
| EP | 0413355 A2 | 2/1991 | |
| EP | 0558210 A1 | 1/1993 | |
| EP | 0558210 A1 * | 2/1993 | ............. H04B 7/005 |
| EP | 0534681 A2 | 3/1993 | |
| EP | 2983298 A2 | 2/2016 | |
| EP | 3331316 A1 | 6/2018 | |

OTHER PUBLICATIONS

Extended European search report received for EP application No. 20186018.6, mailed on Oct. 6, 2020, 7 pages.
Final Rejection received for U.S. Appl. No. 16/925,354, mailed on Mar. 4, 2022, 11 Pages.
Non-Final Rejection received for U.S. Appl. No. 16/925,354, mailed on Sep. 1, 2021, 09 Pages.
Office Action received for CN Application No. 202010679899.X, mailed on Apr. 22, 2022, 13 Pages (07 Pages of English Translation and 06 Pages of Official notification).

* cited by examiner

METHOD OF COMPENSATING WITH FEEDBACK

RELATED APPLICATIONS

This application claims priority to U.S. Provisional application Ser. No. 16/925,354, filed Jul. 10, 2020, now U.S. Pat. No. 11,483,778, which is incorporated herein by reference in its entirety and which in turn claims priority to U.S. Provision Appln. No. 62/874,731, filed Jul. 16, 2019 and 62/939,289, filed Nov. 22, 2019.

TECHNICAL FIELD

This disclosure relates to the field of compensators, more specifically to the field of compensators for use in vehicle applications.

DESCRIPTION OF RELATED ART

Compensator systems are used to compensate for in-vehicle loses in RF systems. Such systems typically have a transceiver mounted in a vehicle, an antenna mounted remotely from the transceiver (in certain embodiments the antenna is mounted on or near an exterior of the vehicle so as to improve reception of the antenna), a cable that extends between the antenna and the transceiver and an internal amplification system that ensures the signal provided to the antenna is at the desired level with the intention to compensate for internal system losses (such as losses in the cable).

FIG. 1 illustrates a prior art compensator system 100. The system 100 comprises a remote antenna unit 101 which includes a power meter 120, a voltage detector 122, RF circuits 118 and a diplexer 114 along with an antenna 130. System 100 further comprises a feeding unit 102 which includes a transceiver 110, a baseband device 104, a voltage termination 112 and another diplexer 114. Units 101 and 102 are connected through a single coax line 116, which can be long. Coax line 116 carries four types of signals: Transmit RF signals 140, Receive RF signals 142, Power feedback signals 144, and TX/RX control signals 146. The Transmit RF and TX/RX control signals are sent from the feeding unit to the remote antenna unit, while the Receive RF and the Power feedback signals are sent in the opposite direction. Voltage termination 112 is used to set the operating conditions of the power feedback and determines the Transmit/Receive direction. Diplexers 114 are used to combine the feedback and control signals with (or separate them from) the RF signals on single coax line 116. The control signals are bi-directional, driven by voltage termination 112 and sampled by ADC 108. Baseband device 104 includes a power control module 106 and, optionally, an analog-to-digital converter (ADC) 108, the roles of which are described next.

In use, in Transmit mode, the output of voltage termination 112 is set to Low (preferably 0), while in Receive mode the output is set to High. The ADC samples the voltage level on the coax control signal (added to the diplexer at the bottom) to realize the power meter 120 reading. The value measured by the ADC is processed by power control module 106, which runs a control loop (not shown but known to one of ordinary skill in the art) and adjusts the output power gain as needed at transceiver 110. Voltage detector 112 determines whether transmission or reception occurs at present, therefore performing TX/RX control. The control module compares the measured power vs. the expected power of the power gain modifier output and changes the gain as needed. The expected power varies per the desired Transmit power of a specific packet. The control mechanism compares the measurement packet-by-packet, and collects statistics for tracking the power changes, as would be clear to one of ordinary skill in the art. Power control module 106 may be implemented in hardware (HW) or in software (SW) running on a processor or central processing unit (CPU).

As is known, part of the losses that are compensated for are related to the length of the cable, the materials used and other environmental factors. As can be appreciated therefore, one disadvantage of the disclosed prior art system is that the compensator system must be customized for each application. As a result, certain individuals would appreciate further improvements to a compensator system.

SUMMARY

A compensator system includes a control loop placed adjacent an antenna. The control loop includes a gain modifier that is configured to adjustably control the gain of a Tx signal being provided to the antenna. A first control unit positioned near the gain modifier controls the amount of gain provided by the gain modifier. The first control unit receives feedback from a detector connected to the output of the gain modifier that allows the first control unit to ensure the gain modifier is providing the appropriate amount of gain.

In one embodiment a transceiver module emits a Tx signal that is directed to a cable that is in turn connected to an antenna. A detector measures the power of the transmitted signal and provides an indicium of that detected power level to a second control unit. The second control unit responsively transmits the TX level signal over the cable to the first control unit that controls the gain modifier.

In an embodiment, a diagnostic signal can be provided back to the second control unit, confirming that the first control unit is appropriately controlling the gain of the gain modifier. In addition, if desired, another detector can be coupled to the antenna to ensure that the signal being provided by the antenna is at the appropriate level (thus ensuring the antenna is functioning as intended).

In an embodiment, the transceiver directly provides the Tx signal level along with the Tx signal and the first control unit uses the TX level signal to control the gain modifier. In such an embodiment the control unit again uses one or more detectors as part of a control loop to ensure that the gain is set at the appropriate level.

BRIEF DESCRIPTION OF THE DRAWINGS

The present application is illustrated by way of example and not limited in the accompanying figures in which like reference numerals indicate similar elements and in which.

DETAILED DESCRIPTION

The detailed description that follows describes exemplary embodiments and the features disclosed are not intended to be limited to the expressly disclosed combination(s). Therefore, unless otherwise noted, features disclosed herein may be combined together to form additional combinations that were not otherwise shown for purposes of brevity. It should also be noted that various circuits are known to be capable of being combined into a larger integrated circuit and thus features that are shown as separate functional blocks are contemplated as being combined with other features unless noted otherwise.

Figure 1:
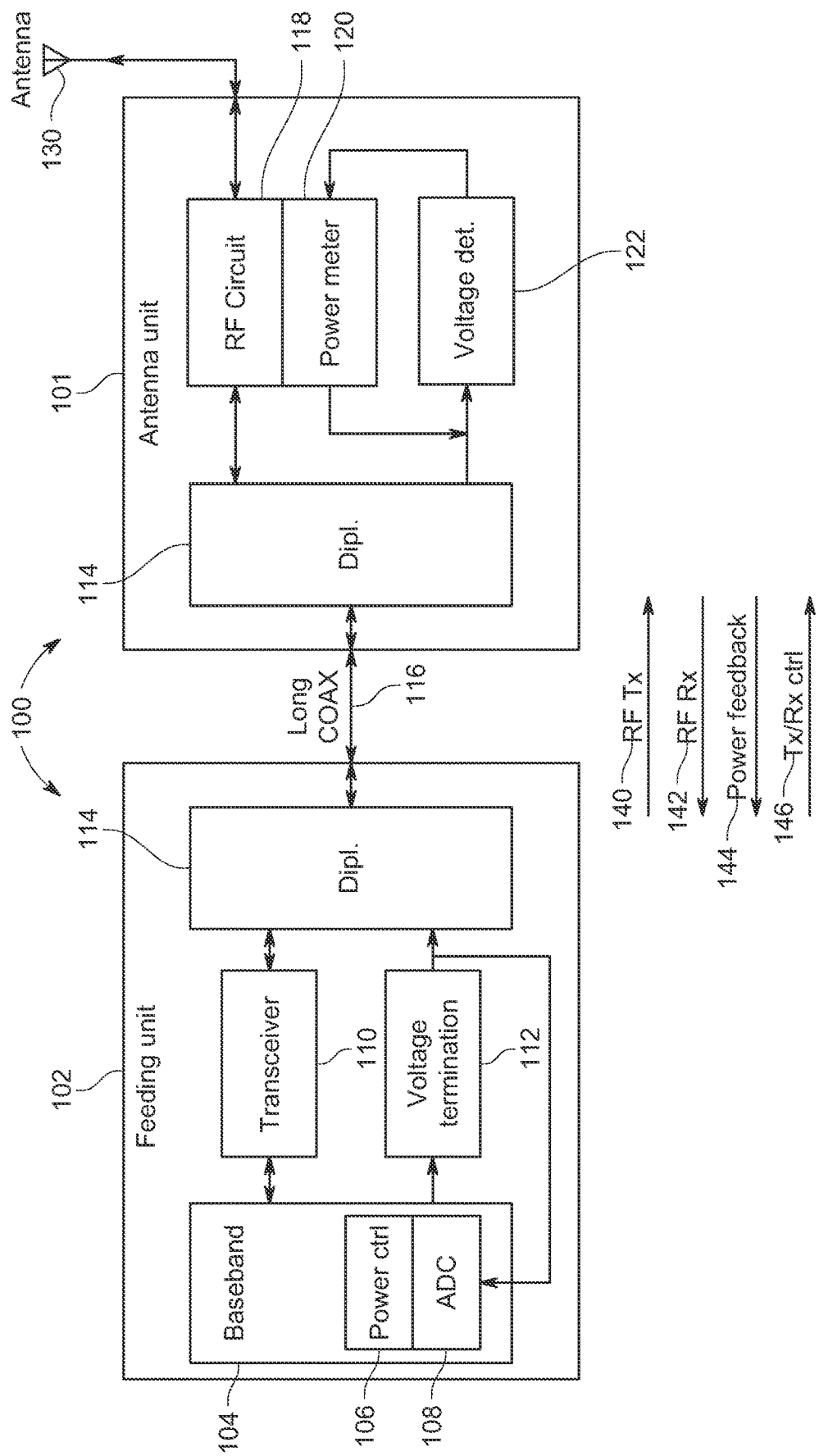
FIG. 1 illustrate a prior art Tx signal compensation system.
Figure 2:
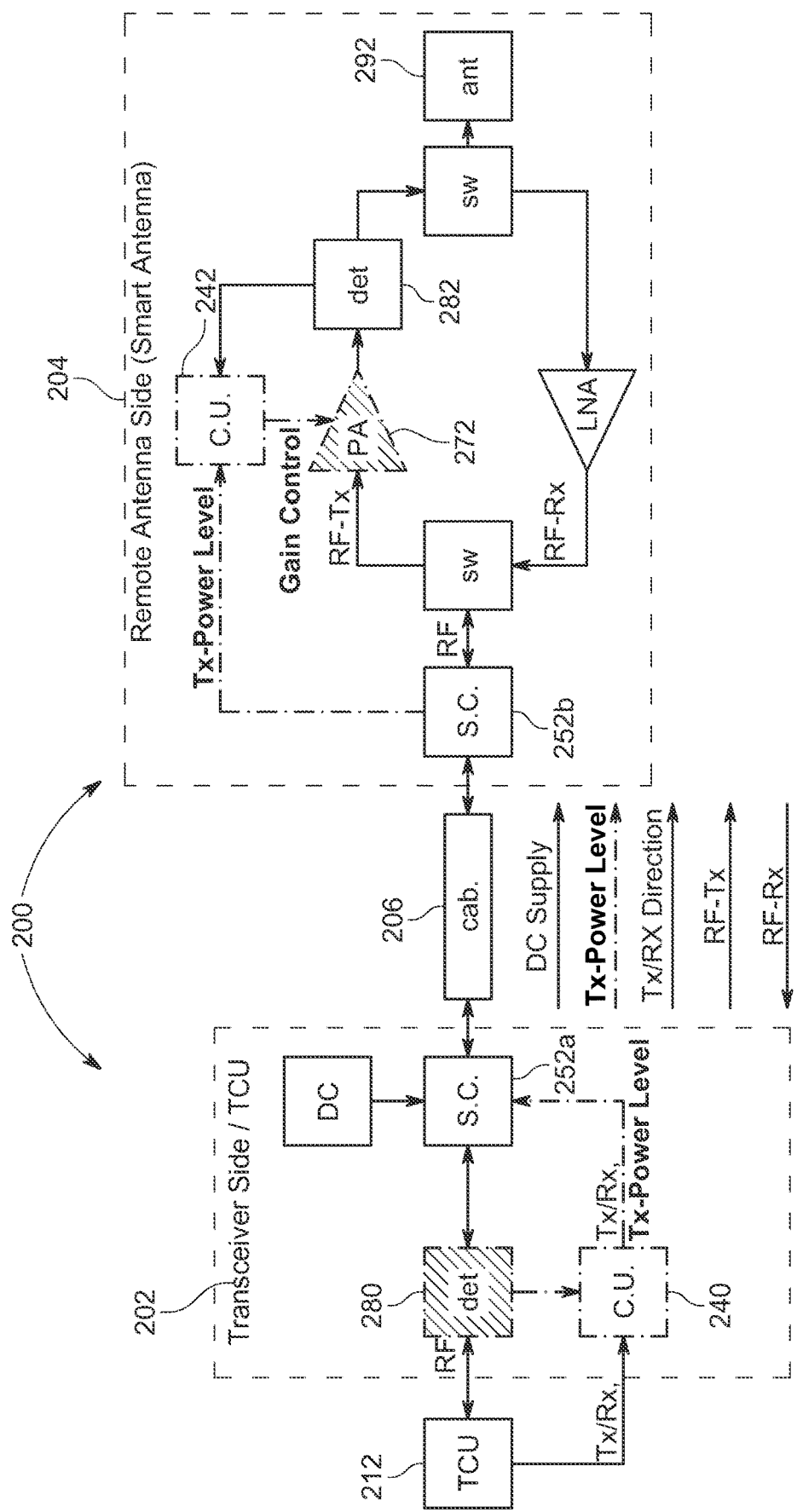
FIGS. 2-4 illustrate features of a first set embodiments of a system that can provide compensation for signal losses in a transceiver-based system.
Figure 3:
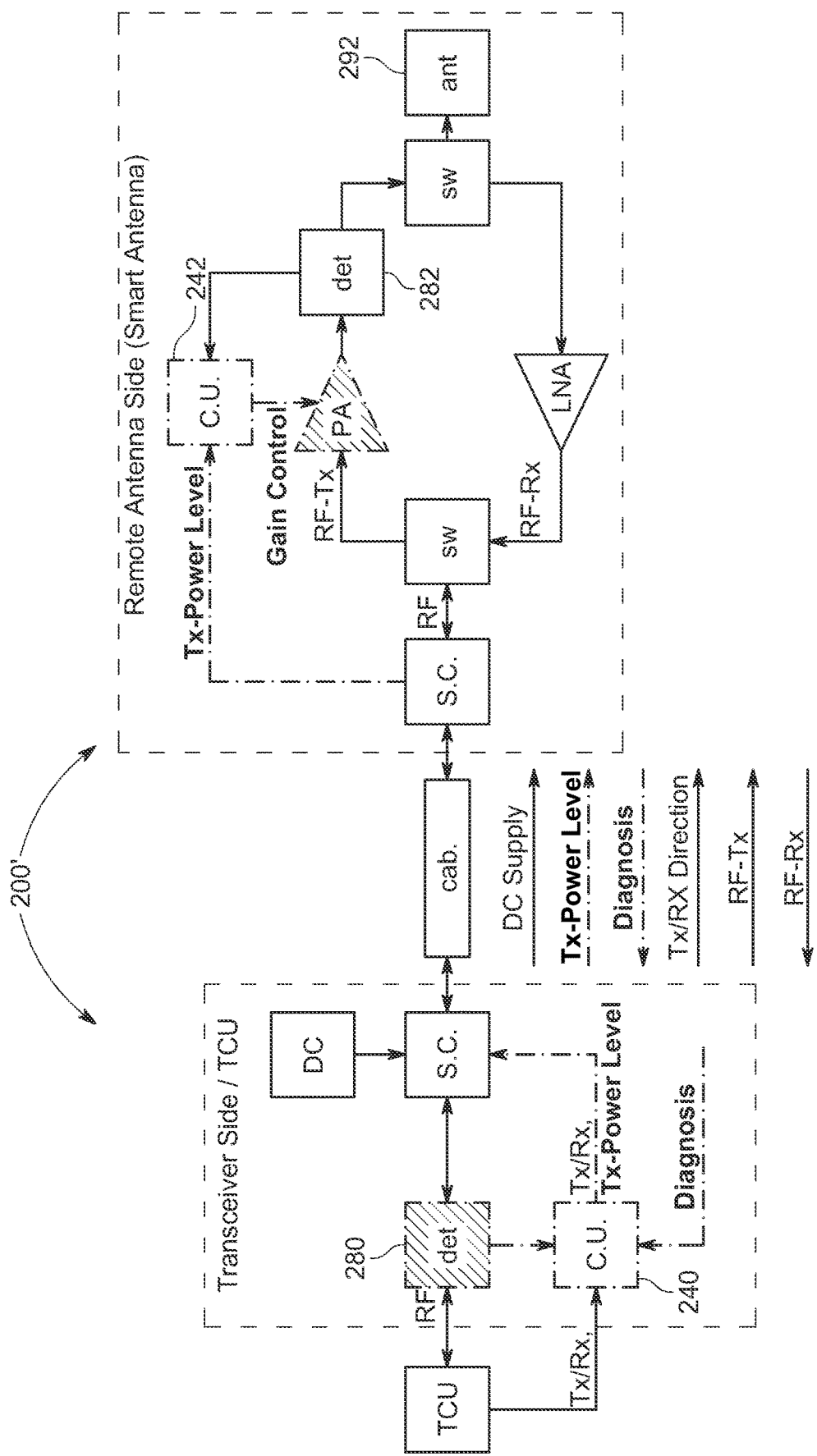
Figure 4:
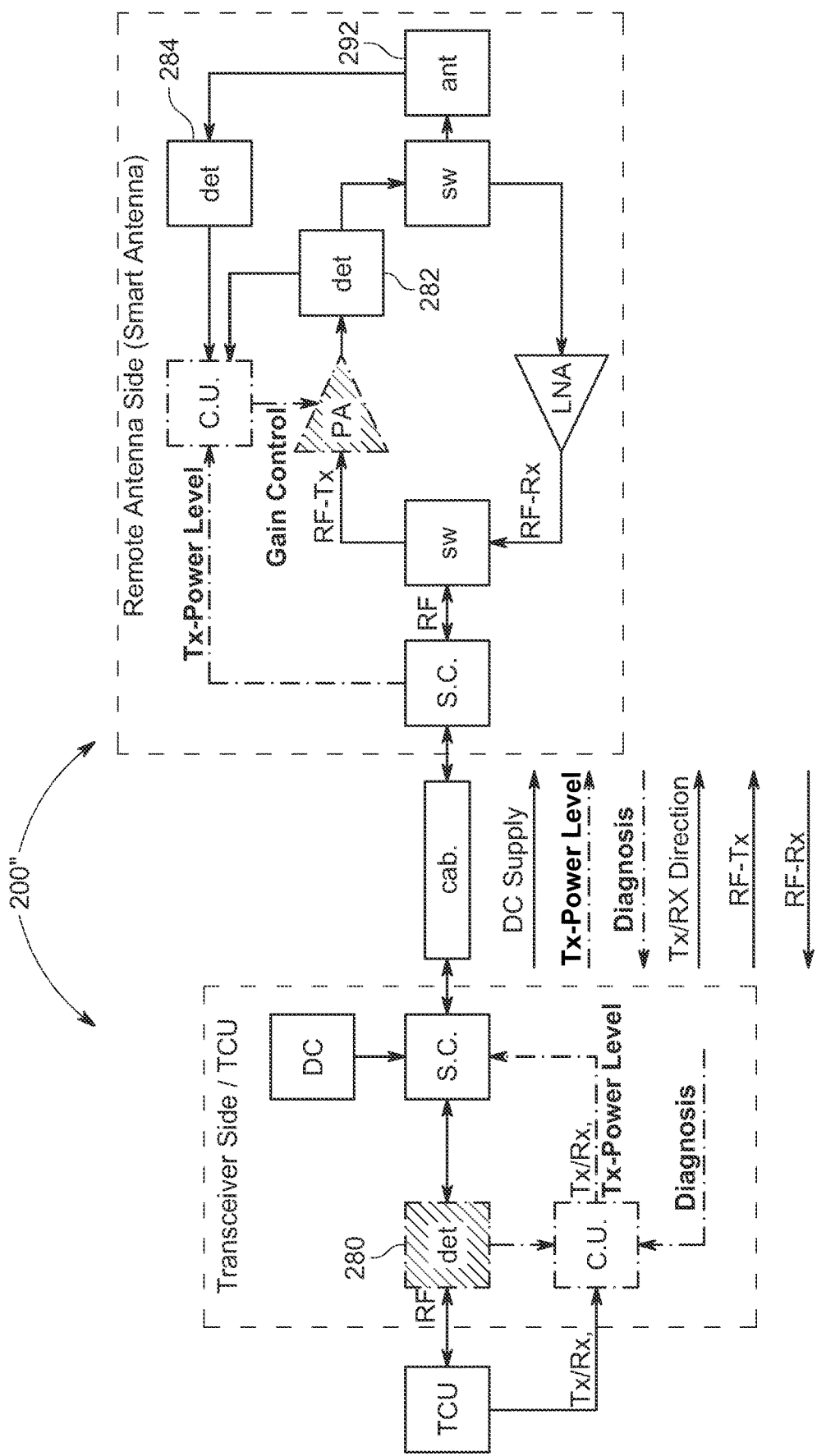

As can be appreciated from FIGS. 2-4, a system is disclosed that allows for compensation of pathloss between a transceiver module and an antenna, regardless of the transceiver module design. More specifically, the system disclosed in FIGS. 2-4 can work with any desirable transceiver without the need to customize the system and, assuming the gain modifier is sufficiently adjustable, without concern for minor variations in the cable between the transceiver module and the antenna. This is possible because the system detects the desired power output directly from the transceiver module and then provides a power level signal to a separate control unit that then uses a local and remote control loop to control gain.

Turning to FIG. 2, a first embodiment of compensator system is depicted as compensator system 200. As illustrated, a transceiver side module 202 includes a transceiver module 212 and the transceiver module 212 transmits a Tx signal that is routed over a cable 206 toward an antenna 292 provided by an antenna module 204. The antenna module 204 includes a first control unit 242 that is configured to ensure the Tx signal is provided to the antenna 292 at the desired power level. The first control unit 242 can do this by controlling the amount of gain (or attenuation) provided by a gain modifier 272 to the Tx signal. The first control unit 242 can do this by providing a control signal corresponding to a desired gain in response to a Tx level signal received from the transceiver side module 202. The first control unit 242 is configured to adjust the amount of gain provided by the gain modifier 272 in respond to feedback signal received from a first detector 282. If the initial gain does not result in a Tx signal that matches the Tx signal provided by the transceiver module 212 then the first control unit 242 can adjust the amount of gain to ensure the Tx signal does have the appropriate power level. As can be appreciated, the control unit 242 can be a standard microcontroller or any desirable ASIC/integrated circuit suitable for operating a control loop that uses a feedback signal and thus can be implemented in hardware and/or software running on a more general-purpose controller. The gain modifier 272 can include multiple stages and be configured to work with a variety of frequencies and can be configured to only amplify, to only attenuate or do a combination of both amplification and attenuation.

As depicted, the transceiver side module 202 includes a second detector 280 that detects the power level of the Tx signal emitted by the transceiver module and provides a detection signal to a second control unit 240 that is indicative of the power level of the Tx signal. The second control unit 240 provides the Tx level signal to the first control unit 242. It should be noted that the Tx level signal can be provided in any desired manner. For example, without limitation, the Tx level signal could be provided as a low frequency signal (typically such a low frequency signal would be at a frequency that is significantly less than frequency of the Tx signal) and the low frequency signal could be added to the cable via signal coupler 252. As can be appreciated, the method of placing the Tx level signal onto the cable can be adjusted depending on operating conditions, the functionality of the control units and whether any additional signals are intended to be duplexed onto the cable 206. Generally speaking, as the cable is carrying a high frequency signal transmitted by the transceiver module (potentially in the 5.9 GHz range) and may also provide phantom DC power in a known manner, it is a straightforward matter to duplex an additional signal on the cable 206.

The Tx level signal (which is indicative of the power level of the Tx signal) provided by the second control unit 240 is separated from the cable via a signal coupler 252 and directed to the first control unit 242. It should be noted that the signal coupler can be bidirectional or unidirectional (depending on system requirements) and can be formed out of conventional components such as one or more of a splitter, a combiner, a diplexer or any other desirable element that can appropriately combine and/or separate signals. The first control unit 242 uses the Tx level signal to determine the appropriate amount of gain and then provides an input to the gain modifier 272 to control the gain of the gain modifier 272. In an embodiment the amount of requested gain can initially be based on the expected losses as the Tx signal travels between the transceiver and the gain modifier 272. In another embodiment the amount of gain can be controlled entirely via the feedback signal. Naturally, other alternatives are also suitable for controlling the starting condition and the method of managing the starting condition is not intended to be limiting unless otherwise noted. The first control unit 242 receives a feedback signal from a first detector 282 that monitors an output power of the Tx signal provided by the gain modifier 272. If the output power measured by the first detector 282 is inconsistent with the Tx level signal that was provided by the second control unit 240 then the first control unit 242 can adjust the gain provided by the gain modifier 272 so as to ensure the Tx signal provided by the gain modifier is consistent with the Tx level signal.

As noted above, the compensator system 200 can be used with a variety of different transceiver modules because the compensator system 200 can measure the intended output of the transceiver and then ensures the gain modifier provides that level of output power. As can be further appreciated, because the first detector 282 providing feedback to the first control unit 242 is located adjacent to the antenna 292 (e.g., is located in the remote antenna module 204), the power level of the Tx signal can be controlled to a tighter range than would normally be possible. This can be useful to ensure compliance with local regulations regarding signal power levels while maximizing performance since it is known that gain modifiers and cables, as well as other components within the system, can have varying degrees of gain or loss (depending on the type of component) depending on temperature and other external factors.

FIG. 3 depicts a compensator system 200' that is similar to the compensator system 200 shown in FIG. 2 but further includes the provision of a diagnostic signal. The diagnostic signal (which can be provided by the first control unit 242) can be used to let the second control unit 240 (or some other vehicle system) know that the remote antenna module that includes the first control unit 242 is correctly receiving the Tx signal level from the second control unit 240 and/or is providing the Tx signal with the desired power level to the antenna 292. The second control unit 240 can provide this working/not working status signal to the transceiver module 212 or other elements (not shown), which can in turn cascade this information to other systems within a vehicle. As can be appreciated, this diagnostic information allows the overall vehicle system to know that status of the compensator system (e.g., if it is working properly or not), which can be important if the compensator system is intended to be used as part of an overall vehicle control system (e.g., is part of a V2X system).

As can be appreciated, another detector 284 can be added to a compensator system 200" depicted in FIG. 4. The detector 284 can verify that antenna 292 is transmitting the signal (thus confirming, for example, that the compensator system 200" hasn't been physically damaged). This additional level of diagnostic information may be desirable for TCU based systems where the reliability of the communication link between the TCU and external devices is considered an important safety factor or where the antenna 292 is positioned in a location that is potentially subject to damage.

It should be noted that while the second control unit 240 in FIGS. 2-4 is shown as a separate functional element that provides the Tx level signal, in an embodiment the transceiver module could also be configured to output the Tx level signal along with the actual TX signal. Such a modification to the transceiver module would allow for the elimination of separate detector and control unit but would require modifications to the transceiver module that may be more costly to implement (at least in the short term).

Figure 5:
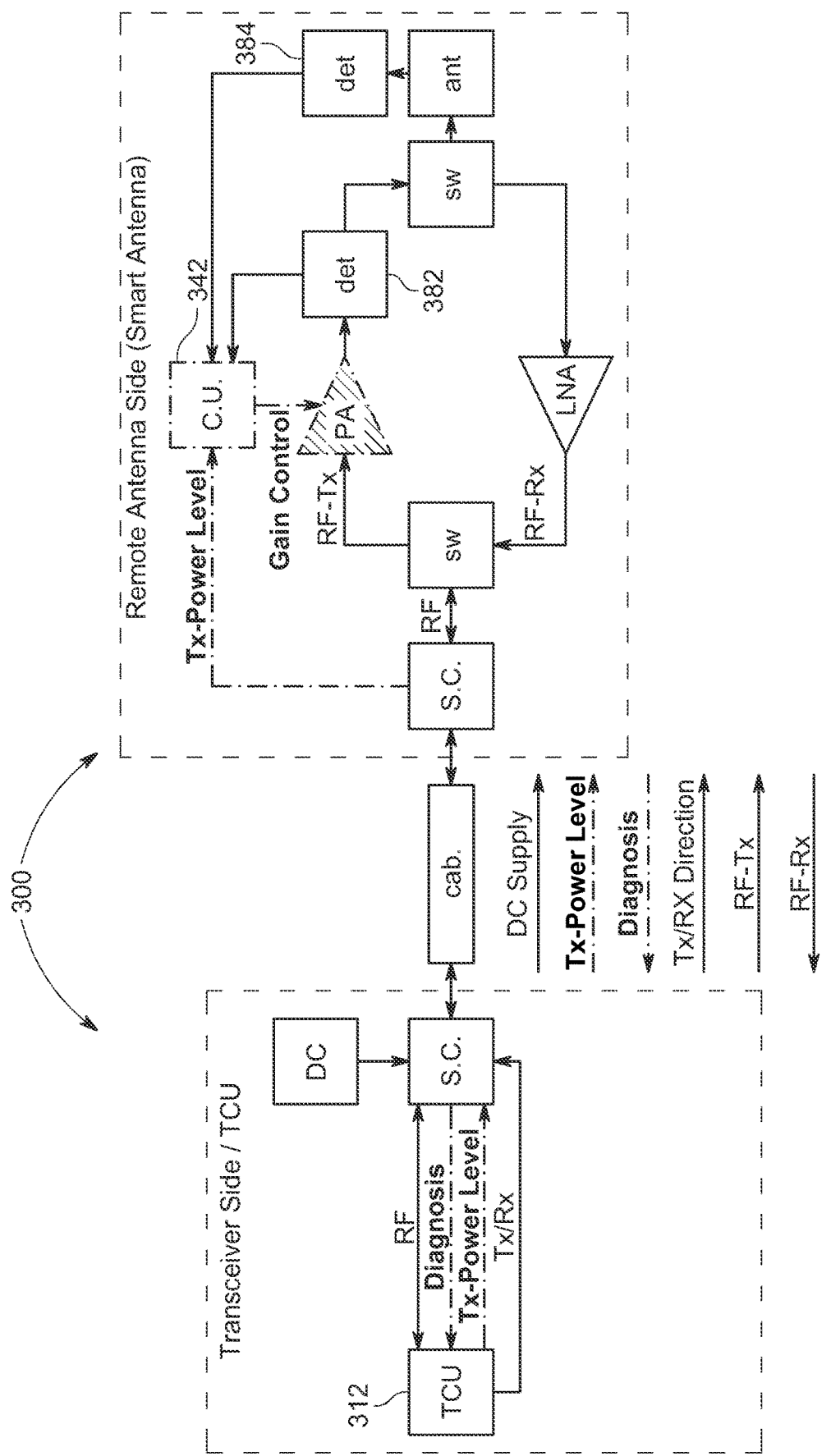
FIG. 5 illustrates features of an embodiment of a system that can provide compensation for signal losses in a transceiver-based system.

FIG. 5 illustrates a compensator system 300 that can function in such a manner. A transceiver 312 is configured to provide a Tx level signal (which can be, as discussed above, can be provided in any other desired format) representative of the intended power level of the Tx signal. As can be appreciated, the Tx level signal can be provided in a modulated manner with the Tx signal or it can be provided via a separate line that is combined onto the cable in a conventional manner by the signal coupler. As in the other compensator systems depicted in FIGS. 2-4, the Tx level signal indicates the desired power level of Tx signal and is provided to a first control unit 342. The first control unit 342 uses the Tx level signal to control the gain of a gain modifier in conjunction with a feedback signal received from one or both of a detector 382 and a detector 384 to ensure that the Tx signal is being provided at the desired power level. As noted above with respect to FIG. 4, the first control unit 342 can also provide an optional diagnostic signal to indicate that the system is functioning appropriately and this diagnostic signal can be provided to any desirable system. Naturally, while the depicted compensator system 300 includes two detectors and is configured to provide a diagnostic signal indicating that the compensator system is working correctly, in a simplified embodiment just one detector may be used and, if desired, the diagnostic signal may be omitted in any of the possible configurations. Thus one or more elements depicted in FIG. 5 may be omitted if determined to be unnecessary from a system performance standpoint.

It should be noted that conventional transceivers are configured to provide a wide range of signal levels. This leads to increase complexity and cost in the transceiver and transmitting higher signal levels increases the chances of feedback to the transceiver due to reflected signal (which must be compensated for if the transceiver is going to function appropriately). If desired, the compensator system 300 can be used with a transceiver module that is configured to provide a Tx signal at a more limited output level in comparison to standard output level range, potentially at a level (or levels) that would help to achieve better system linearity and/or error vector magnitude, along with a Tx level signal indicating the appropriate power level of the Tx signal. The control unit 342 would receive the Tx level signal and, as in the above examples, control the gain modifier in response to a feedback signal received from one or more detectors to ensure the Tx signal leaving the gain modifier was at the desired power level.

As can be appreciated, the above features regarding gain control have been discussed with respect to the Tx signal. If desired, similar such features and techniques could also be used to modify the Rx signal. Thus, the depicted compensator system can include additional features if they are so desired.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A method, comprising:
providing a Tx signal from a transceiver to a first end of a cable that is positioned in a vehicle;
providing a Tx level signal to the first end of the cable, the Tx level signal indicative of a power level to be transmitted from an antenna supported by the vehicle; and
modifying a gain of the Tx signal at a second end of the cable with a gain modifier that drives the antenna, wherein the gain modifier is controlled by a first controller and the first controller adjusts the gain of the gain modifier based on the Tx level signal;
wherein the method includes providing a modulated signal that includes the Tx level signal.

2. The method of claim 1, wherein the adjusting of the gain modifier is based on receiving a feedback signal from a detector that detects an output of the gain modifier.

3. The method of claim 2, wherein the detector detects the output directly from the gain modifier.

4. The method of claim 2, wherein the detector detects the output from the gain modifier being transmitted by the antenna.

5. The method of claim 2, wherein the detector is a first detector and the first controller receives feedback from the first detector and a second detector, wherein the second detector is positioned downstream of the antenna.

6. The method of claim 5, wherein the method includes providing, via the second detector, a transmitted feedback signal to the first controller.

7. The method of claim 2, wherein the detector is positioned between the gain modifier and the antenna.

8. The method of claim 1, wherein the Tx level signal is provided by a second controller positioned adjacent the transceiver, the second controller using a detected power level of the Tx signal provided by the transceiver to determine the Tx level signal.

9. The method of claim 8, further comprising detecting the power level of the Tx signal with a detector positioned adjacent the second controller.

10. The method of claim 1, wherein the transceiver provides the Tx level signal.

11. The method of claim 10, wherein the transceiver provides the modulated signal that includes the Tx level signal.

12. The method of claim 1, wherein the Tx signal has a transmitted power level when provided to the gain modifier, and wherein the method includes:
in response to receiving the Tx level signal that is separate from the transmitted power level, providing, via the first controller, a control signal to the gain modifier indicating a level of gain; and adjusting, via the first controller, the control signal in response to a feedback signal from a detector, the feedback signal associated with a detected power level of the Tx signal provided by the gain modifier.

13. The method of claim 1, wherein the Tx level signal is separated from the cable via a signal coupler.

14. The method of claim 1, wherein the method includes measuring intended output power of the transceiver and ensuring the gain modifier provides an appropriate amount of gain for the intended output power of the transceiver.

15. The method of claim 1, wherein the method includes providing a diagnostic signal to a second controller to confirm that the first controller is appropriately controlling the gain of the gain modifier.

16. The method of claim 15, wherein the method includes using a detector to ensure that the Tx signal being provided to the antenna is at an appropriate level.

17. The method of claim 1, wherein the method includes directly providing the Tx signal and Tx level signal from the transceiver to the first controller, which uses the Tx level signal for controlling the gain modifier.

18. The method of claim 17, wherein the method includes the first controller using one or more detectors as part of a control loop to ensure that the gain is set at an appropriate level.

* * * * *